US006935371B2

(12) United States Patent
Stares

(10) Patent No.: US 6,935,371 B2
(45) Date of Patent: Aug. 30, 2005

(54) HIGH CAPACITY GLOBE VALVE

(75) Inventor: James A. Stares, Norton, MA (US)

(73) Assignee: Dresser, Inc., Addison, TX (US)

(*) Notice: Subject to any disclaimer, the term of this patent is extended or adjusted under 35 U.S.C. 154(b) by 128 days.

(21) Appl. No.: 10/082,620

(22) Filed: Feb. 22, 2002

(65) Prior Publication Data

US 2003/0159737 A1 Aug. 28, 2003

(51) Int. Cl.[7] .................. F16K 47/04
(52) U.S. Cl. .................. 137/625.37; 137/625.38
(58) Field of Search .................. 137/625.37, 625.38, 137/625.39, 625.33

(56) References Cited

U.S. PATENT DOCUMENTS

| | | | | |
|---|---|---|---|---|
| 223,573 A | | 1/1880 | Ainsworth et al. | |
| 817,153 A | * | 4/1906 | Barr | 137/625.39 |
| 871,775 A | | 11/1907 | Glanchard et al. | |
| 1,333,048 A | | 3/1920 | Webster | |
| 1,511,302 A | | 10/1924 | Schnetzer | |
| 1,648,708 A | | 11/1927 | Wilkinson | |
| 2,585,290 A | | 2/1952 | Walker | 73/211 |
| 2,911,009 A | | 11/1959 | Parker | 137/625.41 |
| 2,915,087 A | * | 12/1959 | Kruschik | 137/625.37 |
| 3,023,783 A | | 3/1962 | Vickery | 137/625.12 |
| 3,443,793 A | | 5/1969 | Hulsey | 251/209 |
| 3,700,003 A | | 10/1972 | Smith | 137/614 |
| 3,707,161 A | | 12/1972 | Crawford | 137/269 |
| 3,709,245 A | | 1/1973 | O'Connor, Jr. | 251/127 |
| 3,746,049 A | | 7/1973 | O'Connor, Jr. | 137/802 |
| 3,776,278 A | | 12/1973 | Allen | 137/625.38 |
| 3,780,767 A | | 12/1973 | Borg et al. | 137/625.3 |
| 3,813,079 A | | 5/1974 | Baumann et al. | 251/127 |
| 3,826,281 A | | 7/1974 | Clark | 137/625.31 |
| 3,860,032 A | | 1/1975 | Rogers | 137/614.17 |
| 3,880,191 A | | 4/1975 | Faumann | 137/625.32 |
| 3,941,350 A | | 3/1976 | Kluczynski | 251/127 |
| 3,954,124 A | | 5/1976 | Self | 138/42 |
| 3,960,177 A | | 6/1976 | Baumann | 137/625.31 |
| 3,971,411 A | | 7/1976 | Baumann | 137/625.3 |
| 3,974,860 A | | 8/1976 | Stead et al. | 137/625.3 |

(Continued)

FOREIGN PATENT DOCUMENTS

| | | |
|---|---|---|
| CA | 1128832 | 8/1982 |
| CA | 1229024 | 11/1987 |
| CH | 237 241 | 8/1945 |

(Continued)

OTHER PUBLICATIONS

Brochure "Tell Your COntrol Valves To Pipe Down"; pp. 39.
Brochure "Grove B–5 Bal Valves 6–48"; pp. 10.
Introl; "Series 61 and 62 High Performance Rotary Valves"; Kent Process Control Inc.; pp. 40.

(Continued)

*Primary Examiner*—John Fox
(74) *Attorney, Agent, or Firm*—Fish & Richardson P.C.

(57) ABSTRACT

A high flow globe valve with a body defining an interior cavity in communication with a first and second fluid passages. A tubular throttling cage is offset in the cavity away from the second fluid passage and has an open end in communication with the first fluid passage. The throttling cage has flow ports angled towards the second fluid passage and the flow port nearest the second fluid passage is oversized. The throttling cage has flow splitter defined by two adjacent flow ports through the cage opposite the second flow passage. A plug is closely received in the throttling cage and moveable to cover the flow ports thereby restricting flow through the throttling cage.

19 Claims, 2 Drawing Sheets

U.S. PATENT DOCUMENTS 3,987,809 A 10/1976 Baumann ..................... 138/42
3,990,475 A 11/1976 Myers ..................... 137/625.3
4,022,423 A 5/1977 O'Connor et al. .......... 251/127
4,085,774 A 4/1978 Baumann ................. 137/625.3
4,111,229 A 9/1978 Christian ............... 137/614.17
4,149,563 A 4/1979 Seger ...................... 137/625.3
4,212,321 A 7/1980 Hulsey .................. 137/625.32
4,226,263 A 10/1980 Muchow ................ 137/614.17
4,230,154 A 10/1980 Kalbfleish .............. 137/614.17
4,249,574 A 2/1981 Schnall et al. ........... 137/625.3
4,256,284 A 3/1981 Balhouse .................... 251/126
4,295,632 A 10/1981 Engelke ...................... 251/127
4,364,415 A 12/1982 Polon .................... 137/625.32
4,367,807 A 1/1983 Fink et al. .................. 181/230
4,397,331 A 8/1983 Medlar ....................... 137/375
4,402,485 A 9/1983 Fagerlund ................... 251/118
4,479,510 A 10/1984 Bey ...................... 137/625.31
4,530,375 A 7/1985 Bey ...................... 137/625.32
4,540,025 A 9/1985 Ledeen et al. ......... 137/625.32
4,610,273 A 9/1986 Bey ...................... 137/625.32
4,617,963 A 10/1986 Stares ..................... 137/625.3
4,619,436 A 10/1986 Bonzer et al. ............. 251/61.1
4,624,442 A 11/1986 Duffy et al. ............... 251/61.1
4,691,894 A 9/1987 Pyötsiä et al. .............. 251/127
4,774,984 A 10/1988 Peters .................. 237/625.32
4,784,039 A 11/1988 Leinen ........................ 91/387
4,825,906 A * 5/1989 Hartman .................. 137/625.3
4,881,718 A 11/1989 Champagne ................ 251/209
4,889,163 A 12/1989 Engelbertsson ........ 137/625.32
4,929,088 A 5/1990 Smith ......................... 366/337
4,967,998 A 11/1990 Donahue .................... 251/121
4,973,406 A 11/1990 Ponzielli .................. 210/333.1
5,070,909 A 12/1991 Davenport ............. 137/625.32
5,116,019 A 5/1992 Rohweder et al. .......... 251/127
5,180,139 A 1/1993 Gethmann et al. .......... 251/127
5,193,583 A 3/1993 Gethmann et al. ..... 137/625.32
5,218,984 A 6/1993 Allen ............................ 137/1
5,277,404 A 1/1994 Andersson .................. 251/315
5,287,889 A 2/1994 Leinen .................... 137/625.3
5,332,004 A 7/1994 Gethmann et al. ..... 137/625.32
5,400,825 A 3/1995 Gethmann et al. ..... 137/625.32
5,427,147 A 6/1995 Henriksson .............. 137/625.3
5,437,305 A 8/1995 Leinen .................. 137/625.32
5,482,249 A 1/1996 Schafbuch et al. ......... 251/118
5,492,150 A 2/1996 Aquilino ................ 137/630.13
5,509,446 A 4/1996 Bey ...................... 137/625.32
5,511,584 A 4/1996 Leinen .................... 137/625.3
5,516,079 A 5/1996 Baumann ..................... 251/61
5,630,528 A 5/1997 Nanaji ........................... 222/1
5,680,889 A 10/1997 Boger ................... 137/625.32
5,730,416 A 3/1998 Welker ....................... 251/118
5,758,689 A 6/1998 Leinen .................. 137/625.32
5,765,814 A 6/1998 Dvorak et al. .............. 251/127
5,769,388 A 6/1998 Welker ....................... 251/118
5,771,929 A 6/1998 Boger ................... 137/625.32
5,890,505 A 4/1999 Boger ........................... 137/1
5,924,673 A 7/1999 Welker ....................... 251/118
5,931,445 A 8/1999 Dvorak et al. .............. 251/118
5,988,586 A 11/1999 Boger ........................ 251/127
6,003,551 A 12/1999 Wears ................... 137/625.33
6,029,702 A 2/2000 Leinen et al. .......... 137/625.32
6,079,451 A 6/2000 Hegler ....................... 138/121
6,105,614 A 8/2000 Bohaychuk et al. ..... 137/625.3
6,250,330 B1 6/2001 Welker ....................... 137/489
6,289,934 B1 9/2001 Welker ........................ 138/39

FOREIGN PATENT DOCUMENTS

| | | | | |
|---|---|---|---|---|
| DE | 858 178 | | 12/1952 | |
| DE | 1 200 688 | | 9/1965 | |
| DE | 23 52 370 | | 4/1975 | |
| DE | 23 59 717 | | 6/1975 | |
| DE | 24 35 561 | | 2/1976 | |
| DE | 26 54 769 | C3 | 6/1978 | |
| DE | 26 54 769 | B2 | 6/1978 | |
| DE | 26 54 769 | A1 | 6/1978 | |
| DE | 30 17 857 | A1 | 11/1981 | |
| DE | 43 28 095 | A1 | 2/1995 | |
| EP | 0 325 846 | B1 | 1/1991 | |
| EP | 0 621 428 | A1 | 10/1994 | |
| EP | 0 831 262 | A2 | 3/1998 | |
| EP | 0 838 617 | A1 | 4/1998 | |
| EP | 0 746 708 | B1 | 12/1998 | |
| FR | 1050164 | | 1/1954 | |
| FR | 1462437 | | 11/1966 | |
| GB | 751 060 | | 6/1956 | |
| JP | 114066 | * | 7/1982 | ............ 137/625.37 |
| JP | 2000-202027 | | 7/2000 | |
| WO | WO 94/07063 | | 3/1994 | |
| WO | WO 98/31957 | | 7/1998 | |

OTHER PUBLICATIONS

Bulletin No. LOT–1; H.D. Baumann Assoc. Ltd.; 2500 Series LO–T Control Valve; The First Low Torque and Low Noise Butterfly Valve; pp. 5.

A Major Advance in Control Valve Technology; SD CN3000, 3000 Series; pp. 5.

Brochure; Nel–Jamesbury; Q–Ball; The Unique Rotary Cntrol Valve; pp. 9.

Brochure; Varimax 3000 Series LO–DB Trim; pp. 24.

Tech Notes; "Lab Tests Super Ctonrol Valves"; Oildom Publishing Co. of Texas; Nov. 1997; pp. 1.

Bulletin; SD CH3000 May 1997, 41000 Series; *Foreword*; Masoneilan North American Operations; 1997; pp. 6.

Patent Abstracts of Japan, vol. 008, No. 270, Dec. 11, 1984 of JP 59 140970 A dated Aug. 13, 1984.

International Search Report for for International Application No. PCT/US 03/05407 dated Jun. 13, 2003.

* cited by examiner

HIGH CAPACITY GLOBE VALVE

BACKGROUND OF THE INVENTION

1. Technical Field of the Invention

The present invention relates to high capacity valves, and more particularly to a globe valve configured to reduce flow losses and increase fluid flows therethrough.

2. Description of Related Art

In a globe valve, flow between a first fluid passage and a second fluid passage is controlled by a plug movable within a tubular throttling cage. Fluid flowing from the first passage to the second passage flows into the throttling cage through an open end, and out of the throttling cage through a plurality of radially oriented flow ports. Alternately, fluid flowing from the second passage to the first flows into the throttling cage through the radial flow ports and out the open end to the first passage. In either case, the plug is movable to selectively cover the flow ports, thereby restricting flow through the throttling cage and the valve.

The flow path through a globe valve is convoluted. In an example where fluid is flowing from the first passage to the second, fluid passes through the open end and into the throttling cage about its axis. Thereafter, the flow must be diverted 90° to exit through the radially oriented flow ports. Flow out through the radially oriented flow ports exits in all directions (360°) and is collected and directed towards a single passage. Thus, a portion of the flow exiting the radially oriented flow ports is diverted as much as 180° to flow around the interior of the valve to the passage. The directional changes are exacerbated in an inline configuration where the valve inlet and outlet are on a common flow axis, because the throttling cage is positioned in perpendicular relation to the common flow axis. As a result, the flow must be diverted an additional 90° to flow through the open end of the throttling cage. Further, the radial flow ports may not be vertically aligned with the outlet, and thus the flow between the second passage and the flow ports must be diverted to a common axis.

The convoluted flow causes flow losses in areas of the valve that are not controlled by the throttling cage and plug. Not only do the losses limit the overall flow efficiency of the valve, but because they are independent of the flow throttling, the losses impact the characteristics of the throttling control. In other words, as the flow rate increases the total flow loss through the valve becomes more a function of flow rate and less a function of the amount of the flow port covered by the plug.

Prior attempts to reduce flow losses have included increasing the size of the valve body and the fluid ports through which the fluid flows. Unfortunately, larger components such as a larger valve body and a larger throttling cage and plug that would result from the larger fluid ports, also increase the weight and cost of the valve. Further, such larger components also require stronger and more expensive mechanisms, for example the mechanism on which the plug reciprocates. It is preferable that a valve conform to commercially standardized installation dimensions. These dimensions limit the extent to which the size of the valve body and other components can be increased.

Therefore, there is a need for a globe valve that has reduced flow losses, especially at high flow rates, that is comparable in size, weight, and cost to other globe valves.

SUMMARY OF THE INVENTION

The present invention is drawn to a globe valve with refinements that reduce flow losses and increase maximum fluid flows therethrough. The valve has a flow body defining an interior cavity in communication with a first fluid passage and a second fluid passage. The volume of the cavity is substantially equally distributed about a central axis. A tubular throttling cage resides in the cavity. The throttling cage has an open end in communication with the first passage and a plurality of flow ports arranged about a perimeter of the throttling cage. Fluid can flow between the first fluid passage and the second fluid passage through the throttling cage. The longitudinal axis of the throttling cage is positioned offset from the central axis of the cavity. A plug is closely received in the throttling cage and movable about the longitudinal axis to selectively cover the flow ports thereby restricting flow between the first fluid passage and the second fluid passage. At least one of the flow ports facing the second fluid passage can be larger than at least one or all of the other flow ports. The flow ports can be angled towards the second fluid passage. The flow ports can pass substantially straight through the throttling cage.

An advantage of the invention is that the offset throttling cage allows more annular volume between the throttling cage and the cavity walls in which to more gradually expand or contract flows through the throttling cage. This more gradual expansion or contraction reduces fluid separation from the cavity walls and turbulent flow mixing that causes fluid drag.

Another advantage of the invention is that the angled flow ports reduce inertial flow losses as the flow impinges on the cavity wall, because the flow directional changes within the valve are made more gradually.

Another advantage of the invention is that the flow ports can pass straight through the throttling cage and are thus less expensive to manufacture than curved flow ports and require a thinner throttling cage wall thickness to achieve the same directional change.

These and other advantages will be apparent from the following detailed description with reference to the following drawings.

BRIEF DESCRIPTION OF THE DRAWINGS

Various objects and advantages of the invention will become apparent and more readily appreciated from the following description of the presently preferred exemplary embodiments, taken in conjunction with the accompanying drawings of which.

DETAILED DESCRIPTION OF THE EXEMPLARY EMBODIMENTS OF THE INVENTION

Figure 1:
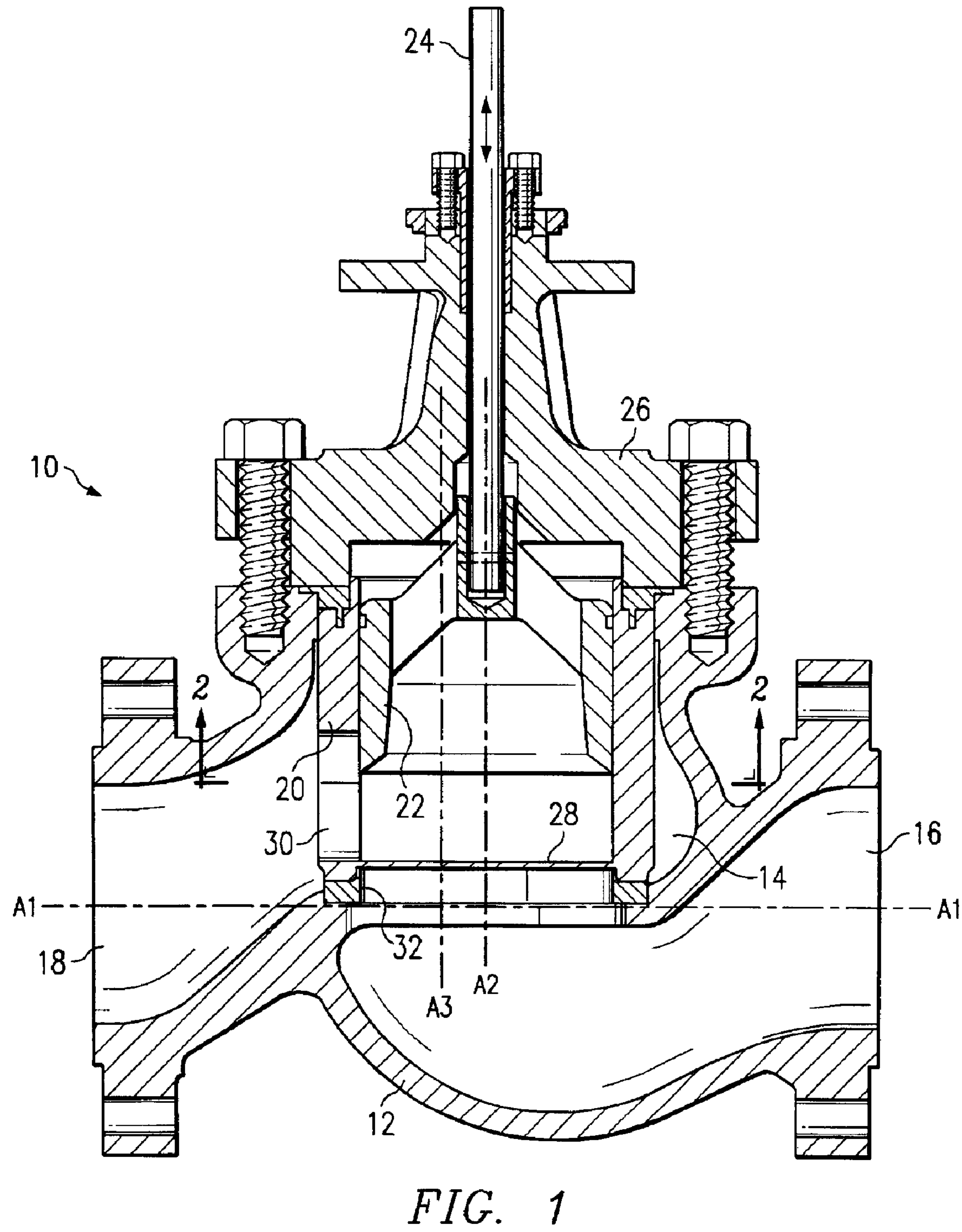
FIG. 1 is a side cross-sectional view of a globe valve constructed in accordance with the invention.

Referring first to FIG. 1, a globe valve 10 constructed in accordance with the invention has a flow body 12. Flow body 12 defines an interior cavity 14 in communication with an first fluid passage 16 and a second fluid passage 18. In the exemplary embodiment of FIG. 1, the first fluid passage 16 intersects a bottom of the cavity 14 near its center and the second fluid passage 18 intersects a side wall of the cavity 14. The interior of flow body 12 is contoured, so that fluid flows smoothly between the first fluid passage 16 and the second fluid passage 18. Further, the flow body 12 depicted in FIG. 1 is that of an inline configuration where, at opposite ends of the valve 10, the first fluid passage 16 and the second fluid passage 18 are substantially centered about the same axis A1. Fluid can travel through the valve 10 in either direction, from the first fluid passage 16 to the second fluid passage 18 or from the second fluid passage 18 to the first fluid passage. However, the valve 10 is most effective when the first fluid passage 16 is an inlet and the second fluid passage 18 is an outlet. Although the concepts are described herein with reference to an inline configuration globe valve, the concepts are applicable to many other various configurations of globe valves.

The interior cavity 14 contains a tubular throttling cage 20 with a longitudinal axis A2 that is substantially perpendicular to the axis A1. The throttling cage 20 concentrically receives and guides a throttling plug 22 for movement of the plug 22 along the longitudinal axis A2. Plug 22 depends from a reciprocating stem 24 extending downward through an upper housing 26 (or bonnet) over the cavity 14. Fluid flows through an open end 28 of the cage 20, and also through a plurality of radially or laterally oriented fluid ports 30 arranged about its perimeter (see FIG. 2). Thus, if fluid enters through the first fluid passage 16, it will flow up through the open end 28 into the cage 20, out through the fluid ports 30 into the cavity 14, and out through the second fluid passage 18. Alternately, fluid flowing from the second fluid passage 18 to the first fluid passage 16 will flow from the second fluid passage 18 through the fluid ports 30 and into the throttling cage 20, then through the open end 28 to the first fluid passage 16. In one exemplary embodiment, the throttling cage 20 has a substantially cylindrical cross-section, and the plug 22 has a circular profile that fits closely within the inner diameter of the cage 20.

The plug 22 throttles flow through the throttling cage 20 by selectively covering a portion of the ports 30 thereby reducing the available area through which fluid can flow. Thus, the maximum flow through the valve 10 is achieved when the plug 22 is fully retracted (see FIG. 1) to cover the least, or no, amount of the flow ports 30. The plug 22 may be configured to seal to the open end 28 of the throttling cage 20 or to the flow body 12 when fully extended to stop substantially all of the flow into the throttling cage 20 and through the valve 10. The throttling cage 20 can also be sealed to the flow body 12, so that substantially all of the flow through the valve 10 passes through the throttling cage 20. In the exemplary embodiment of FIG. 1, a seal 32 is provided at the bottom of the cavity 14 on the flow body 12 that seals the throttling cage 20 to the flow body 12 and enables the plug 22 to seal with the throttling cage 20.

Figure 2:
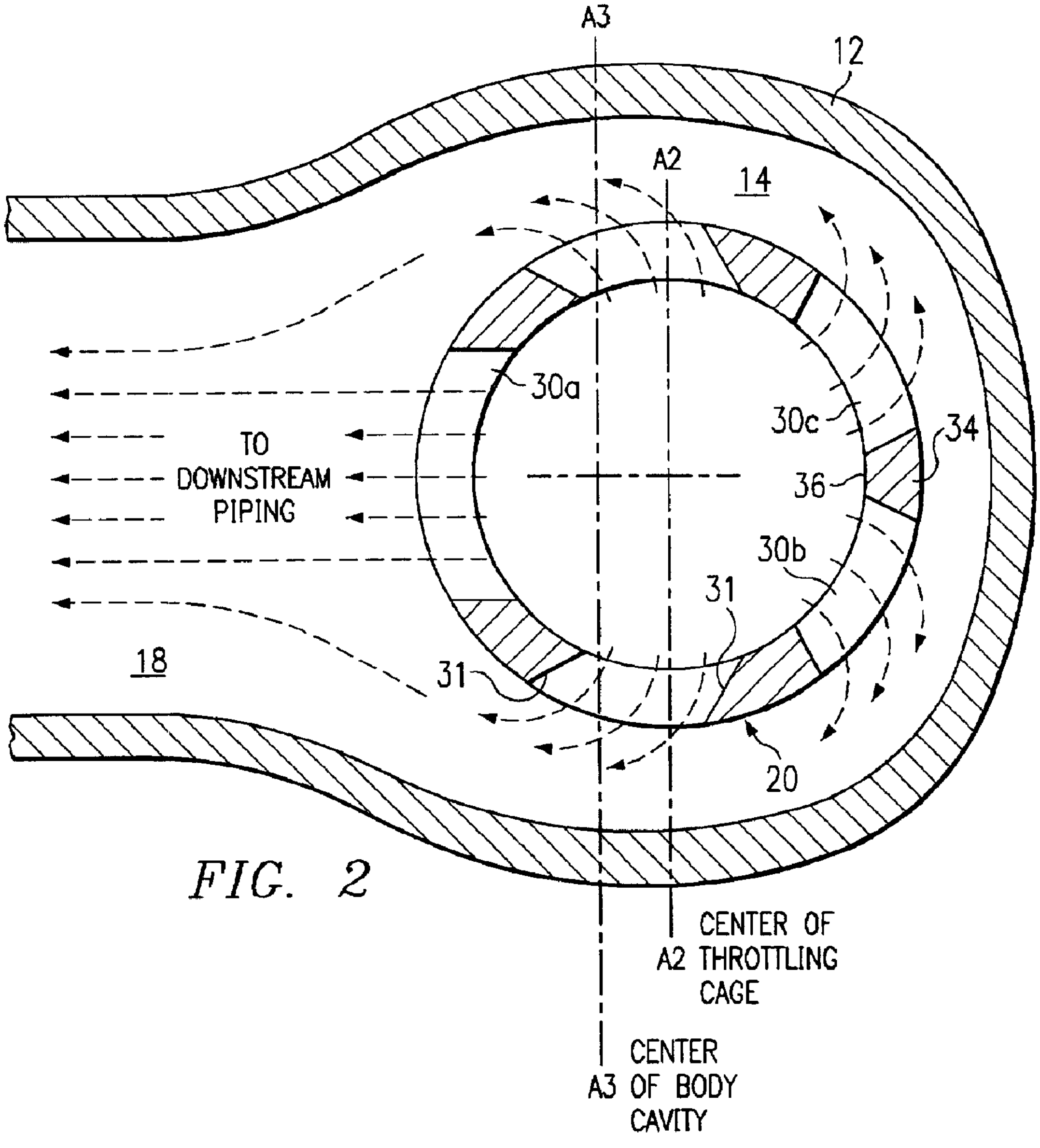
FIG. 2 is a top cross-sectional view of a globe valve constructed in accordance with the invention.

Referring to FIG. 2, the globe valve 10 constructed in accordance with the invention has several improvements to minimize restrictions to flow in the valve. The volume of the cavity 14 is substantially equally distributed about a central axis A3 that is substantially perpendicular to the axis A1. The longitudinal axis A2 of the throttling cage 20 is offset from the central axis A3 away from the second fluid passage 18. As a result, the annular volume of the cavity 14 between the throttling cage 20 and the flow body 12 increases from an area of least annular volume adjacent the throttling cage 20 opposite the second fluid passage 18 to an area of maximum annular volume in proximity to the second fluid passage 18. This additional annular volume enables fluid flows between the throttling cage 20 and the second fluid passage 18 to more gradually expand or contract, depending on the flow direction, than if the throttling cage 20 was centered in the cavity 14. Thus, as fluid flows from the first fluid passage 16 to the second fluid passage 18 and is restricted by the throttling cage 20, for example by the flow ports 30, the flow can gradually expand as it passes into the second fluid passage 18. Alternately, as fluid flows from the second fluid passage 18 towards the first fluid passage 16, the flow can gradually contract to pass through the restriction of the throttling cage 20. The gradual fluid expansion or contraction reduces the tendency of the fluid flow to separate from the cavity 14 walls and the resulting turbulent flow mixing that causes increased resistance to fluid flow through the valve 10.

The fluid ports 30 are angled with respect to radii of the cavity 14 (or the throttling cage 20), such that fluid exiting the ports 30 impinges on the cavity 14 walls at an angle other than perpendicular to the wall surface. Further, the ports 30 are angled towards the second fluid passage 18 to direct flow from within the throttling cage 20 towards the second fluid passage 18, or flow from the second passage 16 into the throttling cage 20, thereby contributing to the directional change necessary to route the flow through the throttling cage 20. In an exemplary embodiment, the fluid ports 30 on one side of the throttling cage 20 are a mirror image of those on the other side. Also, the fluid ports 30 furthest from the second passage 16 are oriented to distribute fluid evenly to either side of the cavity 14. The angled fluid ports 30 reduce inertial fluid losses as the fluid impacts the cavity 14 wall, because the directional change is made gradually.

In an exemplary embodiment, the fluid ports 30 are straight passages without curvature. Thus, the ports 30 pass substantially straight through the wall of the throttling cage 20. Also, the walls 31 of the ports 30 do not have to be parallel, so for example as in FIG. 2, two opposing walls 31 of a single port 30 could be angled differently with respect to the radius of the throttling body. Such a straight through design is easy to manufacture, and does not require as thick of a wall in the throttling cage 20 as is required for a curved port to achieve the same flow diversion. However, curved and other configurations of fluid ports 30 are within the scope of the invention.

The fluid port 30*a* nearest the second fluid passage 18 is larger than other fluid ports 30 and oriented towards the second fluid passage 18 to maximize the amount of flow that can flow directly between the second fluid passage 18 and the interior of the throttling cage 20 without directional changes. Opposite the forward fluid port 30*a* is a flow splitter 34. The flow splitter 34 is a generally triangular portion of the throttling cage 20 wall defined by two adjacent fluid ports 30*b* and 30*c*. A corner of the triangular shape 36 helps to split the flow exiting the upstream side of the throttling cage 20 and begin the 180° directional change that is required for the flow exiting the rear of the throttling cage 20. This flow would otherwise impinge on the wall of the cavity 14, thus the flow splitter 34 helps to reduce flow momentum losses as the fluid changes direction and reduces turbulent flow mixing.

Although several exemplary embodiments of the methods and systems of the invention have been illustrated in the accompanying drawings and described in the foregoing description, it will be understood that the invention is not limited to the embodiments disclosed, but is capable of numerous rearrangements, modifications and substations without departing from the spirit and scope of the invention as defined in the following claims.

I claim:

1. A valve comprising:

a valve body defining an interior cavity in communication with a first fluid passage and a second fluid passage, the volume of the cavity substantially equally distributed about a central axis;

a tubular throttling cage in the cavity and in communication with the first fluid passage, the tubular throttling cage positioned such that an annular volume is defined between the throttling cage and a wall of the cavity and having a single plurality of flow ports arranged about a perimeter of the throttling cage, wherein fluid flows between the first fluid passage and the second fluid passage through the throttling cage, a longitudinal axis of the throttling cage is positioned offset from the central axis of the cavity, and all the flow ports alter the direction of fluid flow towards the second fluid passage; and a plug closely received in the throttling cage and moveable about the longitudinal axis to selectively cover the flow ports thereby restricting flow between the first fluid passage and the second fluid passage.

2. The valve of claim 1 wherein the throttling cage is offset in the cavity away from the second fluid passage.

3. The valve of claim 1 wherein the annular volume is smallest in an area of the cavity opposite the second fluid passage.

4. The valve of claim 1 wherein at least one of the flow ports facing the second fluid passage is larger than at least one of the other flow ports.

5. The valve of claim 1 wherein a flow port facing the second fluid passage is larger than any of the other flow ports.

6. The valve of claim 1 wherein the throttling cage has a triangular flow splitter.

7. The valve of claim 6 wherein the triangular flow splitter is in the portion of the throttling cage opposite the second fluid passage.

8. The valve of claim 1 wherein the throttling cage is substantially sealed to the valve body.

9. The valve of claim 1, wherein, to alter the direction of fluid flow towards the second fluid passage, the side walls of the flow ports are substantially straight and angled with respect to radial lines from the center of the tubular throttling cage that intersect the side walls at the inner surface of the tubular throttling cage.

10. The valve of claim 9, wherein all of the angles are greater than 10 degrees.

11. The valve of claim 10, wherein at least some of the angles are greater than 30 degrees.

12. A fluid flow control device, comprising:

a flow body having an internal chamber;

a first fluid passage intersecting the chamber;

a second fluid passage intersecting the chamber;

a tubular member residing in the internal chamber, the tubular member being in communication with the first fluid passage and having a single plurality of fluid ports, wherein all of the fluid ports alter the direction of fluid flow towards the second fluid passage; and a plug adapted for movement in an interior of the tubular member to selectively cover a portion of the ports;

wherein an annular volume between the tubular member and the flow body is smallest opposite the second fluid passage.

13. The fluid flow control device of claim 12 wherein at least one of the fluid ports is larger than the other fluid ports.

14. The fluid flow control device of claim 12 wherein a fluid port facing the second fluid passage is larger than at least one of the other fluid ports.

15. The fluid flow control device of claim 12 wherein two adjacent fluid ports form a triangular flow splitter in the tubular member.

16. The fluid flow control device of claim 15 wherein a fluid port opposite the triangular flow splitter is larger than at least one of the other fluid ports.

17. The fluid flow control device of claim 12, wherein, to alter the direction of fluid flow towards the second fluid passage, the side walls of the fluid ports are substantially straight and angled with respect to radial lines from the center of the tubular throttling cage that intersect the side walls at the inner surface of the tubular member.

18. The valve of claim 17, wherein all of the angles are greater than 10 degrees.

19. The valve of claim 18, wherein at least some of the angles are greater than 30 degrees.

* * * * *